US008582779B2

(12) United States Patent
Messerges et al.

(10) Patent No.: US 8,582,779 B2
(45) Date of Patent: *Nov. 12, 2013

(54) SYSTEM AND METHOD FOR SECURE COMMUNICATIONS IN A COMMUNICATION SYSTEM

(75) Inventors: Thomas S. Messerges, Schaumburg, IL (US); Adam C. Lewis, Buffalo Grove, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 452 days.

This patent is subject to a terminal disclaimer.

(21) Appl. No.: 12/972,485

(22) Filed: Dec. 19, 2010

(65) Prior Publication Data

US 2012/0159159 A1  Jun. 21, 2012

(51) Int. Cl.
*H04L 9/08* (2006.01)

(52) U.S. Cl.
USPC ............. 380/284; 380/43; 380/247; 380/277; 380/283; 713/162; 713/171

(58) Field of Classification Search
None
See application file for complete search history.

(56) References Cited

U.S. PATENT DOCUMENTS

| 7,266,201 | B1 | 9/2007 | Lin |
| 7,409,455 | B2 | 8/2008 | Giloi et al. |
| 7,627,125 | B2 | 12/2009 | Lumsden et al. |
| 2001/0052071 | A1 | 12/2001 | Kudo et al. |
| 2007/0098176 | A1 | 5/2007 | Song |
| 2009/0092254 | A1* | 4/2009 | Lee et al. ............. 380/278 |

OTHER PUBLICATIONS

PCT International Search Report Dated August 30, 2012 for Counterpart Application PCT/US2011/064776.
D. Wing, DTLS-SRTP Key Transport (KTR) fraft-wing-avt-dtls-srtp-key-transport-03; AVT Working Draft; Mar. 9, 2009; 28 Pages.
H. Schulzrinne, et al. RTP:A Transport Protocol for Real-Time Applications; RFC 3550; Jul. 2003; 89 Pages.
J. Arkko, et al. Mikey:Multimedia Internet KEYing; RFC 3830; Aug. 2004; 67 Pages.
M. Westerlunc, et al. "RTP Topologies"; RFC 5117; Jan. 2008; 22 Pages.
Tetra MoU; Security and Fraud Prevention Group; Recommendation 02, Edition 4, End-To-End Encryption; Jan. 27, 2005; 141 Pages.
ETSI EN 300 392-7 Final Draft; V3.2.0 European Standard (Telecommunications Series); Terrestrial Trunked Radio (TETRA); Voice Plus Data (V+D) Part 7; Security; Feb. 2010; 209 Pages.
TIA/EIA Standard; ANSI/TIA/EIA-102.AACA-2001; Project 25; Digital Radio Over-The-Air Rekeying (OTAR) Protocol; Apr. 12, 2001; 216 pages.

* cited by examiner

*Primary Examiner* — Pramila Parthasarathy
(74) *Attorney, Agent, or Firm* — Valerie M. Davis; Kenneth A. Haas

(57) ABSTRACT

A system and method for secure communications in a communication system, wherein the system programs a computer to perform the method, which includes: receiving at least one authentication key, without an encryption key, from a key-management server; receiving a packet, which is encrypted, from a source device; authenticating the packet, using the at least one authentication key, without cryptographically altering the packet; and forwarding the authenticated packet to a destination device of the packet.

17 Claims, 12 Drawing Sheets

1300

| KEY ID TYPE 1302 | VALUE 1304 | COMMENT 1306 |
|---|---|---|
| MBMS KEY DOMAIN ID | 0 | ID OF THE GROUP KEY DOMAIN |
| MBMS SERVIVE KEY ID | 1 | ID OF THE GROUP KEY |
| MBMS TRAFFIC KEY ID | 2 | ID OF THE GROUP TRAFFIC KEY |
| MBMS USER KEY ID | 3 | ID OF THE USER KEY |
| MBMS SRTP ENCR_KEY | 4 | ID OF THE MTK + SRTP ENCR_KEY (DERIVED) |
| MBMS SRTP SALT_KEY | 5 | ID OF THE MTK + SRTP SALT_KEY (DERIVED) |
| MBMS SRTP AUTH_KEY | 6 | ID OF THE MTK + SRTP AUTH_KEY (DERIVED) |
| MBMS SRTCP ENCR_KEY | 7 | ID OF THE MTK + SRTCP ENCR_KEY (DERIVED) |
| MBMS SRTCP SALT_KEY | 8 | ID OF THE MTK + SRTCP SALT_KEY (DERIVED) |
| MBMS SRTCP AUTH_KEY | 9 | ID OF THE MTK + SRTCP AUTH_KEY (DERIVED) |

*FIG. 13*

SYSTEM AND METHOD FOR SECURE COMMUNICATIONS IN A COMMUNICATION SYSTEM

TECHNICAL FIELD

The present disclosure relates generally to communication systems, and in particular to a system and method for secure communications in a communication system.

BACKGROUND

Security is often a mandatory feature of a communication system. A secure communication system employs secure network protocols, such as Secure Real-time Transport Protocol (SRTP) as described in Internet Engineering Task Force (IETF) Request for Comments (RFC) 3711 dated March 2004 (and any subsequent revisions) and Secure Real-time Transport Control Protocol (SRTCP) as described in IETF RFC 3550 dated July 2003 (and any subsequent revisions), to assure privacy for a group during a communication session. As used herein, a group is a communication group, and comprises a number of members, and each member uses a communication device (also interchangeably referred to as device) to participate in a communication session. Within the group, one member, using a device, sends packets (also interchangeably referred to as network packets) that carry encrypted data, such as voice data, to one or more other members of the group.

A secure communication system generally utilizes an infrastructure device, such as a central unit, to receive the packets from a sending device, and then forward the packets to one or more receiving devices. To achieve security for the device-to-device (also interchangeably referred to as end-to-end and member-to-member) communication, the central unit operates as either a translator or a mixer. As a translator, the central unit simply reroutes a packet by replacing destination information in the transport layer headers, such as User Datagram Protocol (UDP) headers and Internet Protocol (IP) headers, with new destination information. However, the translator approach is open to network amplification attacks because the central unit will blindly forward to downstream devices any rogue packets. A single upstream rogue packet could result in many downstream rogue packets, which will consume valuable resources of the network and receiving devices, and help enable Denial-of-Service (DoS) attacks on the network. A DoS attack may paralyze an entire network system.

Alternatively, the central unit functions as a mixer by cryptographically modifying or altering the packets. To cryptographically modify a packet, the central unit decrypts and then re-encrypts the packet after altering the media stream by, for example, converting the media to another format or combining media from multiple simultaneous senders. Accordingly, the central unit must possess the cryptographic keys for all inbound and outbound packets, thus becoming an attack point and a single point of failure and fundamentally breaking end-to-end encryption between endpoints. Furthermore, the central point must possess extra processing power to decrypt and encrypt all the packets in real-time.

Accordingly, there is a need for a system that includes a central server but that nonetheless performs a method that achieves end-to-end security in a communication system without at least some of the shortcomings of the translator and mixer approaches.

BRIEF DESCRIPTION OF THE FIGURES

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

FIG. 13 illustrates a list of key identifier (ID) types in accordance with some embodiments.

Figure 1:
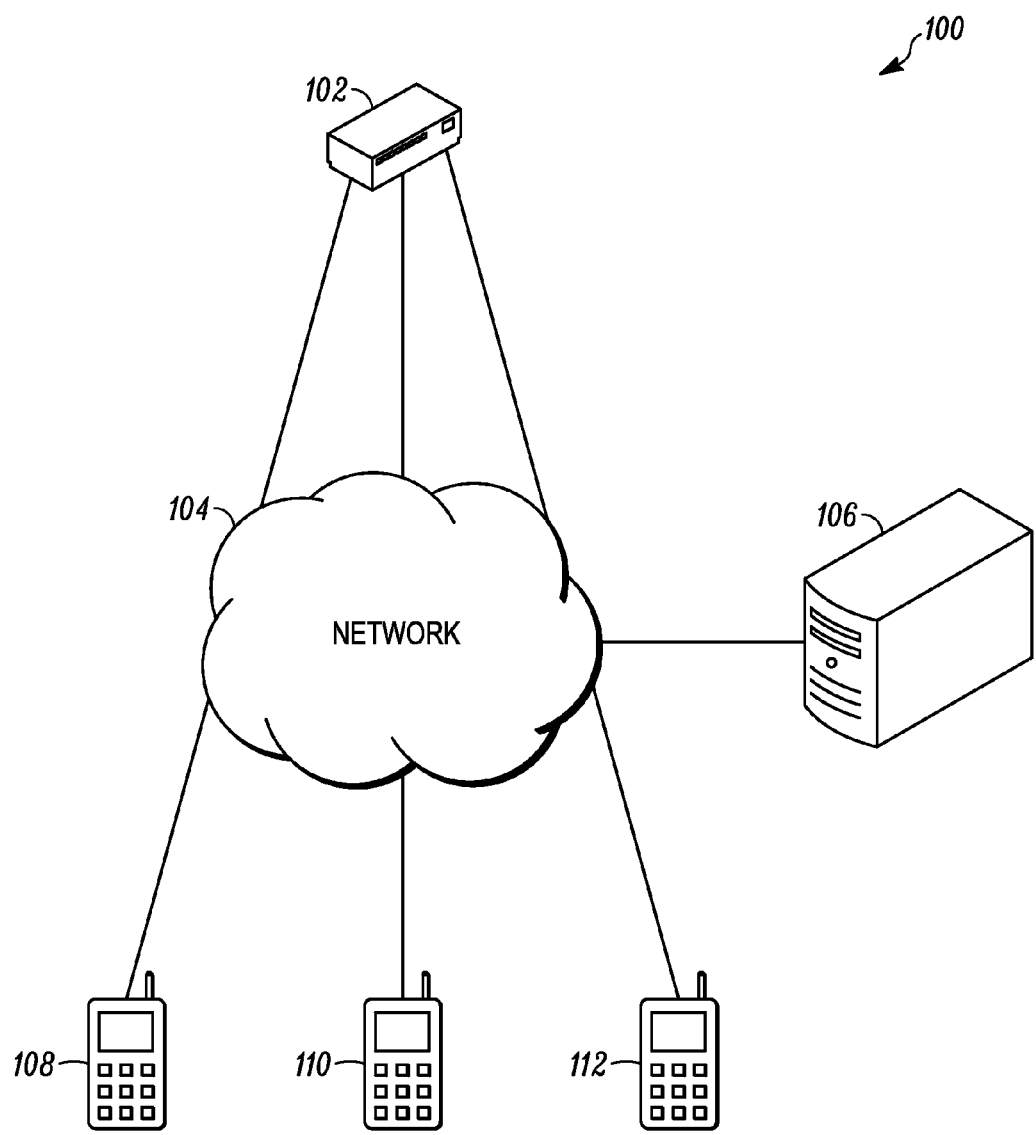
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

System and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method for secure communications in a communication system. To achieve security, communication systems often utilize cryptographic technologies before data is sent over a network. For example, a sending device encrypts data using an encryption algorithm and special knowledge, usually referred to as a key or keys (such as cryptographic keys, encryption keys, security keys, etc.), to generate encrypted data (cipher text) and then send out the encrypted data over the network. The encrypted data is not decipherable to anyone except those possessing the correct keys, e.g., those that were used to encrypt the data in the case of symmetric key cryptography. The receiving device of the encrypted data performs a reverse process, i.e., decryption, to transform the encrypted data back into the original form of the data. In addition, authentication is often used by communication systems to assure correct identification of a user or device. An authentication key is defined as a key that is used by a sending device (also interchangeably referred to as source device) to transform the sender's identification, and the receiving device authenticates the identification using the authentication key.

The keys used for secure communications are often created and distributed by communication system infrastructure devices, such as a key-management server. The key-management server distributes keys to devices using key-management protocols, such as MIKEY, as described in RFC 3830 dated August 2004, and any subsequent revisions. The keys include, but are not limited to, authentication keys, encryption keys, and master keys. For example, SRTP security is based on a master key. From the master key, an encryption key, an authentication key, and a salt key can be derived. Oftentimes, the master key is created for a communication session (also interchangeably referred to as a session) of a communication group. An authentication key can be a group authentication key or a source authentication key. As used herein, a group authentication key is defined as a key that is shared by a group and can be used to authenticate whether a message is originated from a device in the group, while a source authentication key is defined as a key that is shared by only two devices and can be used by one device to authenticate whether a message originated specifically from the other device.

In accordance with the present teachings, a method performed by an infrastructure device for secure communications in a communication system includes: receiving at least one authentication key from a key-management server; receiving a packet containing encrypted data from a source device; authenticating the packet without decrypting or encrypting the packet; and forwarding the authenticated packet to one or more destination devices. As used herein, a source device is the sending device of a packet, and a destination device is the target device of a packet. Accordingly, a device can be both a source device and a destination device, depending on the specific packet under consideration. A source device encrypts data using keys. For example, AES (Advanced Encryption Standard) counter mode encryption uses an encryption key and a salt key. The infrastructure device does not receive, from the key-management server, the corresponding encryption key that is derived from the same master key as the authentication key is.

There are numerous ways by which the infrastructure device forwards or sends a packet to the destination devices of the packet. For example, the infrastructure device sends an individual copy of the packet to the Internet Protocol (IP) address of each destination device of the packet. Alternatively, the infrastructure device sends the packet to a multicast IP address. Accordingly, the terms "forwarding" a packet is meant herein as "redistributing" the packet using any of the aforementioned or other means. Thus, the terms forwarding and redistributing are used interchangeably herein.

Further in accordance with the present teachings, a method performed by a key-management server for secure communications in a communication system includes sending a first set of keys to a source device, and sending a second set of keys to an infrastructure device that forwards the packets sent by the source device to one or more destination device. The first set of keys enables both authentication and encryption of packets sent by the source device to the destination device. For example, the first set of keys contains an authentication key, an encryption key, and a salt key. Alternatively, the first set of keys contains a master key, from which an authentication key, an encryption key, and a salt key are derived. However, the second set of keys enables authentication, but not encryption, of the packets sent by the source device to the destination device. For example, the second set of keys contains a group authentication key and a plurality of source authentication keys.

Further in accordance with the present teachings, a system for secure communications includes a key-management server that sends a first set of keys to a source device, and sends a second set of keys to an infrastructure device. As used herein, the key-management server comprises a processing device coupled to a network interface. The first set of keys enables both authentication and encryption of packets sent by the source device to a destination device, while the second set of keys enables authentication, but not decryption, of the packets sent by the source device to the destination devices. Moreover, the system includes an infrastructure device comprising a processing device coupled to a network interface, which receives the second set of keys, receives a packet with encrypted data from the source device, authenticates the packet without decrypting or encrypting the packet, forwards the authenticated packet to the destination devices. The infrastructure device authenticates the packet using an authentication key from the second set of keys. Those skilled in the art will realize that the above recognized advantages and other advantages described herein are merely illustrative and are not meant to be a complete rendering of all of the advantages of the various embodiments of the present disclosure.

Referring now to the drawings, and in particular FIG. 1, an illustrative communication system 100 implementing embodiments in accordance with the present teachings is shown. Those skilled in the art, however, will recognize and appreciate that the specifics of this illustrative example are not specifics of the invention itself and that the teachings set forth herein are applicable in a variety of alternative settings. The communication system 100 comprises a plurality of communication devices, such as radios, mobile phones, mobile data terminals, Personal Digital Assistants (PDAs), laptops, two-way radios, cell phones, and the like. Three such devices, 108, 110, and 112, are shown herein. A number of devices form a group (also interchangeably referred to as communication group) for the purpose of communication among these devices. One device of the group sends data, such as voice data, to one or more other devices within the group. When transmitted over a network, data is often represented as one or more network packets which include various headers corresponding to different layers of network protocols. For example, when voice data is transmitted using the SRTP protocol, the voice data forms a Real-time Transport Protocol (RTP) payload, the RTP payload is encrypted, and an authentication tag is created and added to the network packet.

Oftentimes, when one device of the group sends out data, for example, voice data for group calls, every other device receives the data. The group communication is carried out over a network 104, and the network 104 utilizes a secure protocol, such as SRTP or SRTCP, to ensure privacy and security of the group communication. A Media Management Function (MMF) server 102 of the communication system 100 facilitates the group communication by receiving data, which is in the format of network packets, from a sending device, and redirecting the packets to one or more destination devices (also interchangeably referred to as target devices) of the group. As used herein, packets received by a device are termed incoming packets of the device, while packets sent out by the device are termed outgoing packets of the device. Moreover, the MMF server 102 is an infrastructure device in accordance with the present teachings. In accordance with the present disclosure, the MMF server 102 further performs authentication on the incoming packets, but does not decrypt or encrypt the incoming packets before forwarding the packets to destination devices of the packets. In addition, the MMF server 102 may attach one or more authentication tags to the outgoing packets.

To enable the packet authentication by the MMF server 102, a key-management server 106 is used to issue security keys, such as master keys and authentication keys. The key-management server 106 creates security keys, such as encryption and authentication keys, which may be derived from a master key. The key-management server facilitates secure key management and distribution. For example, the key-management server creates security keys and distributes the security keys to the MMF server 102 and the devices 108-112. The security key distribution is implemented over a key delivery protocol, such as MIKEY protocol.

Figure 2:
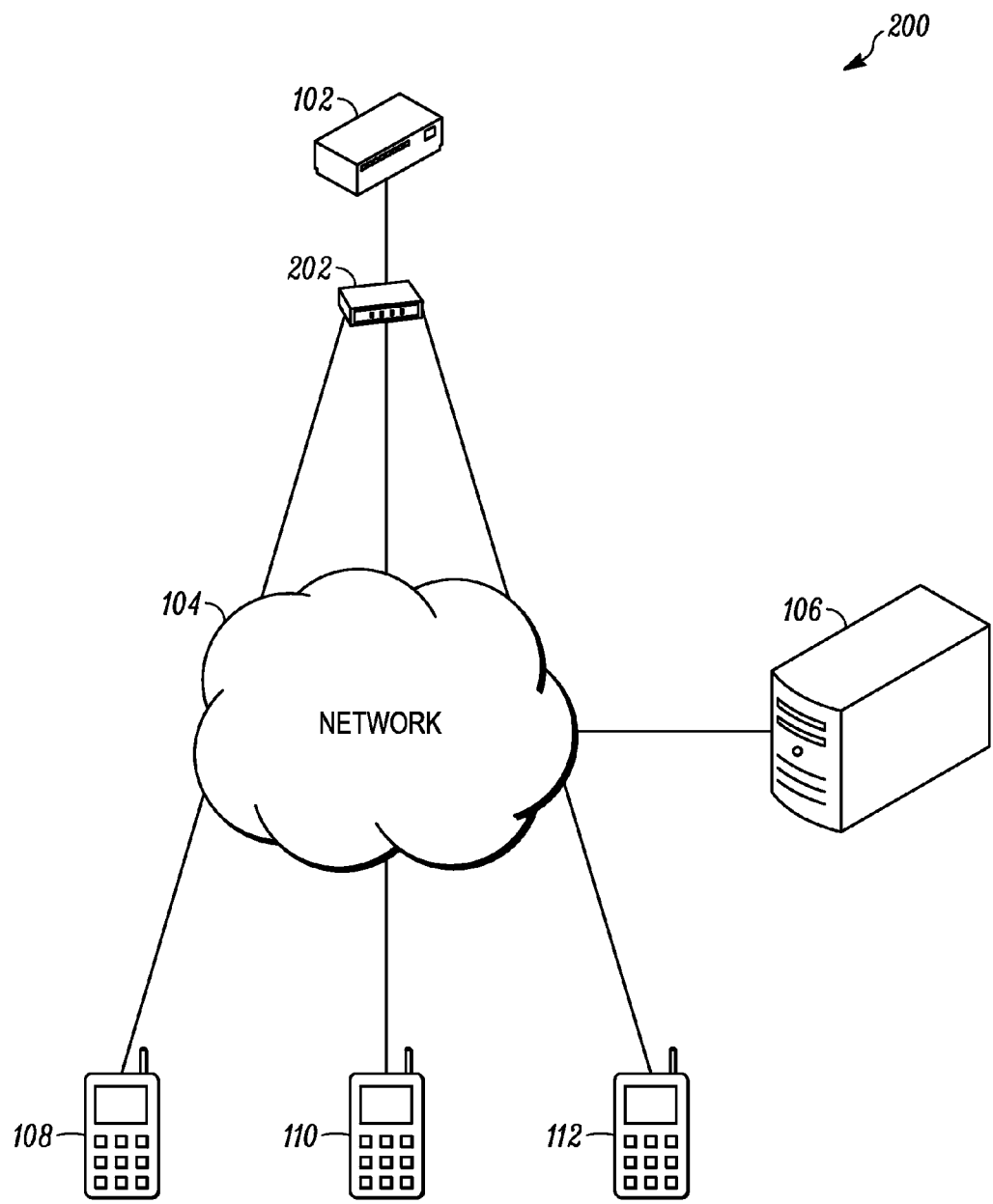
FIG. 2 illustrates a communication system implementing embodiments of the present teachings.

An alternate communication system 200 implementing embodiments in accordance with the present teachings is illustrated in FIG. 2. With the exception of the addition to the system 200 of an authentication gateway 202, all other network elements of system 200 are the same as those of system 100 and are labeled as such. In communication system 200, the authentication gateway 202 is used to perform authentications on network packets. The key-management server 106 creates security keys and distributes the security keys to the devices 108-112 and the authentication gateway 202.

In general, the MMF server 102, key-management server 106, communication devices 108-112, and authentication gateway 202 are implemented using one or more (although not shown) memory devices, network interfaces, and processing devices that are operatively coupled, and which when programmed form the means for these system elements to implement their desired functionality, for example, as illustrated by reference to the system, methods, and accompanying message structures shown in FIGS. 3-13. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the elements of systems 100 and 200 may be programmed with software or firmware logic or code for performing functionality described by reference to FIGS. 3-13; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

End-to-end security in a communication system can be achieved by using secure communication protocols, such as SRTP and SRTCP protocols, and cryptographic technologies, such as AES. SRTP protocol and AES in counter mode are used herein after to illustrate the present teachings.

Figure 3:
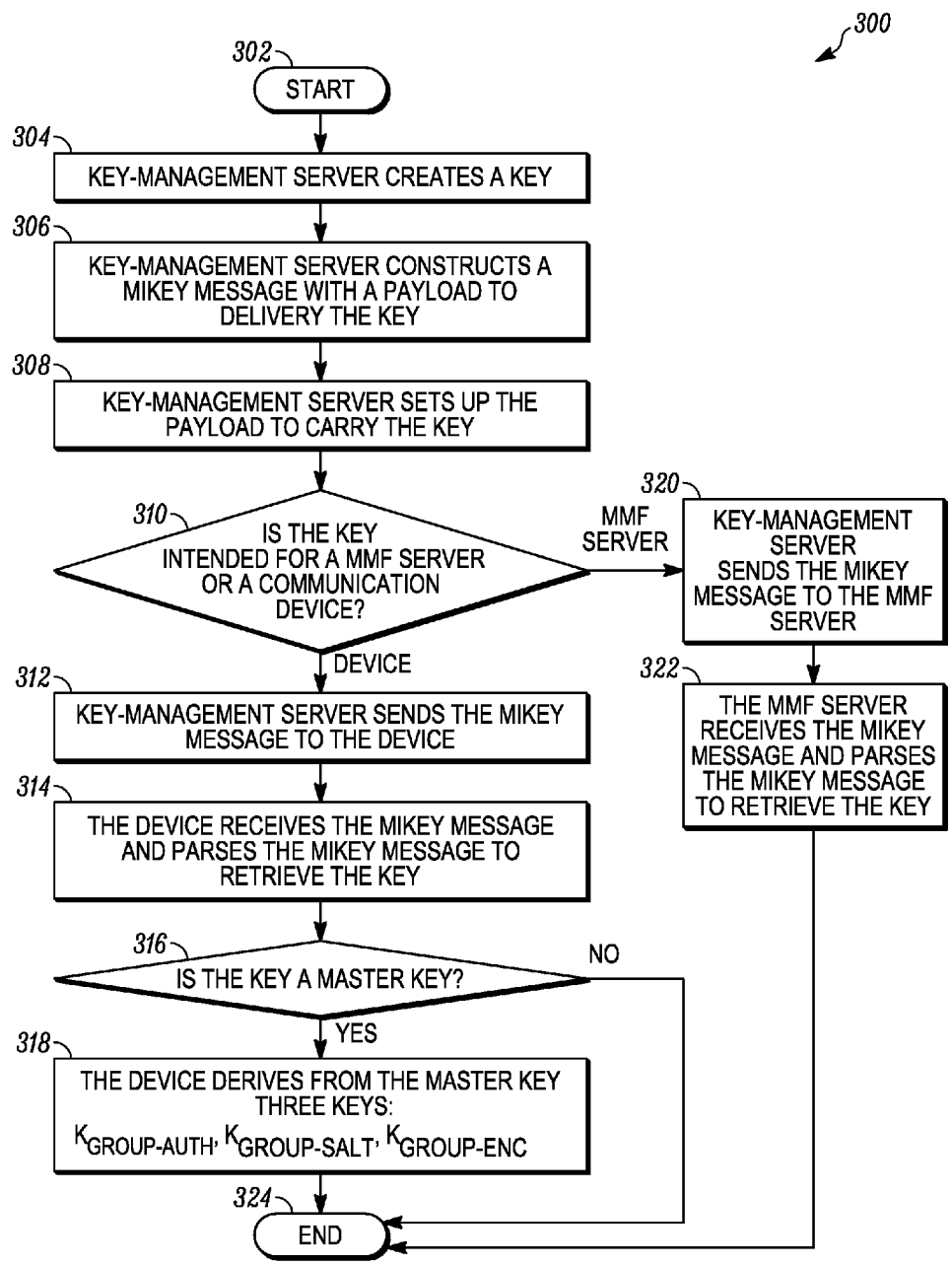
FIG. 3 is a logical flowchart illustrating a method in accordance with some embodiments.

Referring now to the FIG. 3, a method 300 performed by elements of a communication system for key creation and distribution in accordance with the present disclosure is illustrated. Method 300 starts at 302. At 304, a key-management server creates a key, such as a master key or a group authentication key. At 306, the key-management server constructs a MIKEY message with one or more payloads to carry the key. For example, a key data sub-payload or a general extension payload is constructed in the MIKEY message that contains the key.

Figure 4:
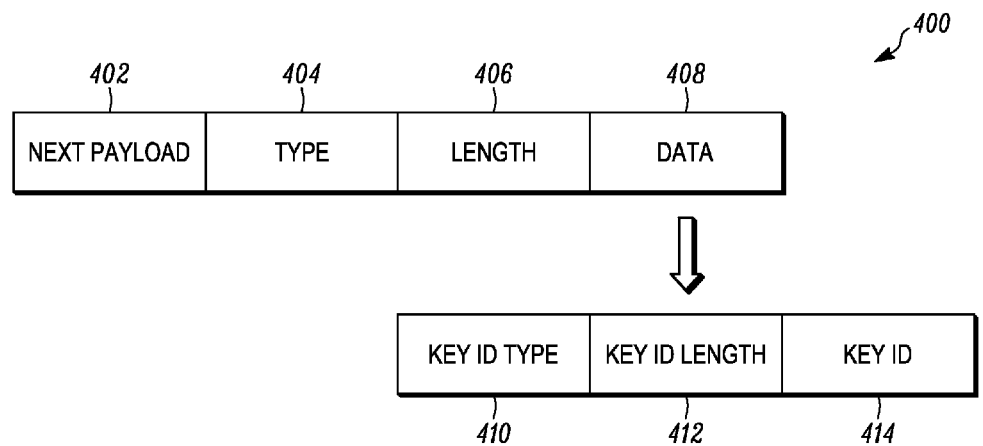
FIG. 4 illustrates a Multimedia Internet KEYing (MIKEY) general extension payload structure in accordance with some embodiments.

Turning momentarily to FIG. 4, a MIKEY general extension payload structure 400 in accordance with some embodiments is shown. A MIKEY message with the payload 400 is utilized to distribute keys in accordance with the present teachings. As described in RFC 4563 dated June 2006, a data field 408 of the general extension payload 400 (i.e., the Key ID Information sub-payload) is used to convey the ID and type of the key being delivered by the MIKEY message. The general extension payload 400 comprises a next payload field 402 that identifies the next payload (not shown) immediately following the payload 400 in the MIKEY message. A type field 404 of the payload 400 contains an LANA (Internet Assigned Numbers Authority) registered value that identifies the type of the general extension payload, and a length field 406 identifies the length in bytes of the data field 408. For identifying a key, the type field 404 should be set to the value of 3, as specified in RFC 4563. When the type field 404 is set to 3, the data field 408 contains a Key ID Information sub-payload, also as specified in RFC 4563. To contain a Key ID Information sub-payload, the data field 408 is logically divided into three subfields, a key ID type subfield 410, a key ID length subfield 412, and a key ID subfield 414. The key ID subfield 414 defines the identity of the key, while the key ID length subfield 412 defines the length of the key ID subfield 414.

The key ID type subfield 410 defines the type of the key. The key ID type subfield 410 is further illustrated by reference to FIG. 13. Turning momentarily to FIG. 13, a key ID type table 1300 in accordance with some embodiments of the present teachings is shown. The key ID type table 1300 comprises a key ID type column 1302 that defines the types of key ID, a value column 1304 that defines the values for the types of key ID, and a comment column 1306 that describes the types of key ID. For example, when a SRTP authentication key is being sent to a MMF server, the key ID type subfield 410 (FIG. 4) is set to a value of 6 to indicate that the key defined in the key ID subfield 414 (FIG. 4) is an SRTP authentication key. In this case, the key ID subfield 414 is set to a Multimedia Broadcast/Multicast Service (MBMS) Traffic Key (MTK) from which the authentication is derived. The June 2006 version of the RFC 4563 defines the first three values (i.e., 0, 1, and 2) of table 1300. The values from 4 to 9 of table 1300 are defined in accordance with some embodiments of the present teachings.

Figure 5:
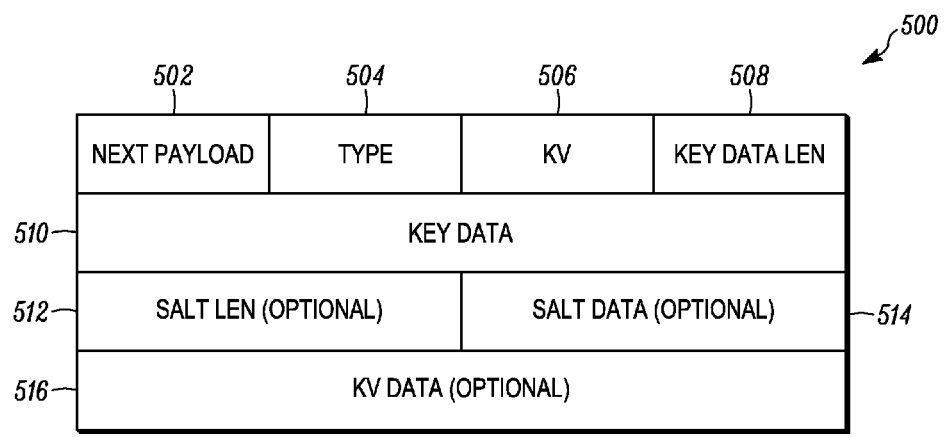
FIG. 5 illustrates a MIKEY key data transport payload structure in accordance with some embodiments.

In accordance with the present disclosure, a key-management server can utilize a MIKEY message with a key data sub-payload to distribute keys. Turning momentarily to FIG. 5, a key data transport payload structure 500 includes a next payload field 502, type field 504, KV field 506, key data len field 508, and key data field 510. The next payload field 502 is set to a value that indicates the next payload (not shown) that immediately follows the payload 500 of the MIKEY. In particular, the next payload field 502 is set to a value of 0 if the payload 500 is the last payload in a MIKEY message. The type field 504 is set to a value that indicates the type of key included in the key data field 510, while the key data len field 508 specifies the length of the key data field 510.

The type field 504 is defined by IETF consensus and managed by LANA. If the general extension field is used to indicate the type of key (as described above) then this type field can be set to any value (since its value is superseded by the type value in the general extension field). As an alternative to using the general extension field to indicate the type of key being delivered, a new type can be added for use in type field 504 to indicate the type of key being delivered. For example, type field 504 may indicate that only an authentication key is being sent by the payload 500, and the authentication key is set in the key data field 510, further indicating to the MMF server that no further derivation on the communicated key should be performed. The key data payload structure 500 further includes three optional fields—a salt len field 512, a salt data field 514, and a KV data field 516. The salt len field 512 specifies the length of the salt key data set in the salt data field 514. The KV data field 516 is used to carry key validity period data, while the KV field 506 indicates the type of key validity period.

Turning back to 306 of FIG. 3, after the MIKEY message is constructed, the key-management server configures and sets up the payload to contain the key at 308. The key-management server determines whether the key is intended for a MMF server or a communication device at 310. The key-management server sends the MIKEY message to the target MMF server, at 320, if the key is intended for a MMF server. At 322, the MMF server receives the MIKEY message, and parses the MIKEY message to retrieve the key from the MIKEY message. The MMF server learns from the MIKEY fields that this is a group authentication key and that no further derivation procedures should be run on it. After 322, execution of method 300 transitions to 324, where the delivery process of the key ends.

Turning back to 310 of FIG. 3, if the key is intended for a device, the key-management server sends the MIKEY message to the target device at 312. At 314, the device receives the MIKEY message, and parses the MIKEY message to retrieve the key from the MIKEY message. At 316, the device determines whether the key is a master key. In more general terms, the device determines whether further derivation of the key is needed or not. If the key is not a master key, execution of method 300 transitions to 324, and no further key derivation is needed. However, if the key is a master key, the device derives three keys from the master key, at 318. The three keys are the group encryption key, $K_{group\text{-}enc}$, the group salt key, $K_{group\text{-}salt}$, and the group authentication key, $K_{group\text{-}auth}$. $K_{group\text{-}enc}$ and $K_{group\text{-}salt}$ are used for data encryption, while $K_{group\text{-}auth}$ is used for authentication. It should be noted that the key delivered by the method 300 may be a master key, group authentication key, group encryption key, salt key, source authentication key, or other types of cryptographic keys. For example, the key-management server sends the master key to devices, and each device derives $K_{group\text{-}auth}$, $K_{group\text{-}enc}$, and $K_{group\text{-}salt}$ from the master key as illustrated by method 300. Alternatively, the key-management server sends the $K_{group\text{-}auth}$, $K_{group\text{-}enc}$, and $K_{group\text{-}salt}$, but not the master key, to the devices.

Figure 6:
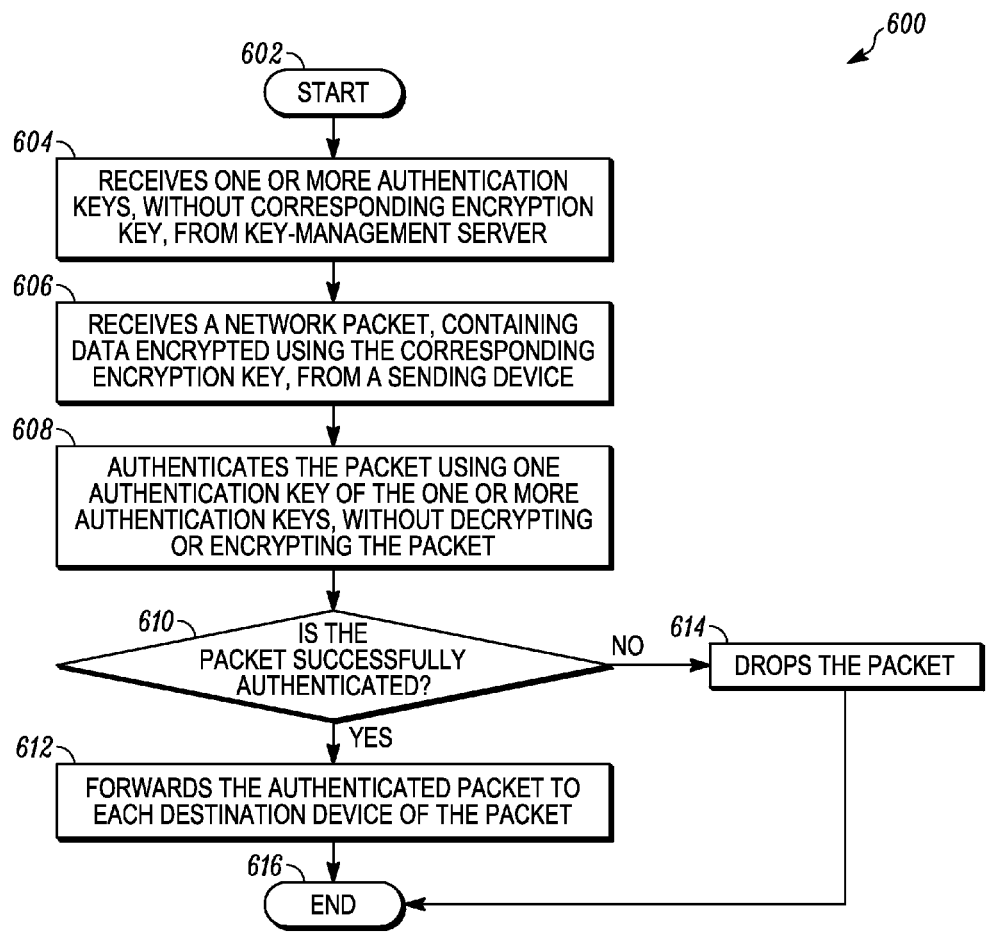
FIG. 6 is a logical flowchart illustrating a method in accordance with some embodiments.

Referring to FIG. 6, a method 600 performed by a MMF server for secure communications in a communication system in accordance with the present teachings is shown. Method 600 starts at 602. At 604, the MMF server receives one more authentication keys, without the corresponding encryption key, from a key-management server. For example, the MMF server receives a group authentication key from the key-management server, but not the group encryption key. Herein, the group authentication key and the group encryption key are parts of a master key, and can be derived from the master key. The group encryption key is said to be the corresponding encryption key of the group authentication key, and the group authentication key is said to be the corresponding authentication key of the group encryption key.

At 606, the MMF server receives a packet from a sending device. The data contained in the packet is encrypted data and augmented with an authentication tag. The data is encrypted by the sending device using the corresponding encryption key and the authentication tag is generated using an authentication key. At 608, the MMF server authenticates the packet using one authentication key that the MMF server received from the key-management server. In one particular embodiment, the group authentication key is used by the MMF server. However, the MMF server does not decrypt the packet or encrypt the packet again after decryption.

By authenticating the packet, the MMF reduces the risk of network security attacks, such as amplification attacks whereby a rogue source sends a single packet to the MMF server which would otherwise be forwarded to the entire group. However, without cryptographically altering the packet (i.e., without decrypting and re-encrypting the packets), the requirement for processing power on the MMF server is reduced. Additionally, because the MMF server does not possess the encryption keys, end-to-end confidentiality is preserved. This is especially important in deployment environments where the MMF server is shared between security domains, where the MMF server is trusted to provide packet replication services but not to be privy to the data being transmitted.

At 610, the MMF server determines whether the packet is successfully authenticated. If the packet fails the authentication, the MMF server simply drops the packet at 614. Alternatively, the MMF server may perform other actions in response to the authentication failure. However, if (at 610) the packet passes the authentication, the MMF server forwards (612) the authenticated packet to each destination device of the packet. As later description of the present teachings will show, the MMF may perform other actions before it forwards the packet to destination devices of the packet. Method 600 ends at 616.

Figure 7:
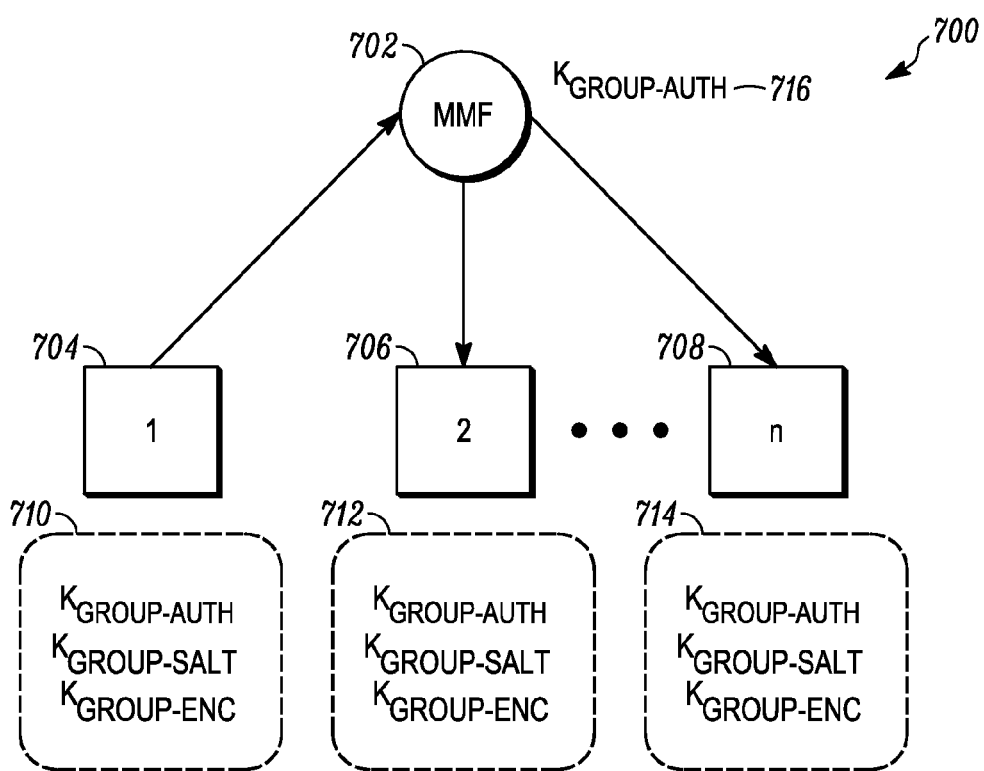
FIG. 7 is a topological diagram illustrating a method in accordance with some embodiments.
Figure 9:
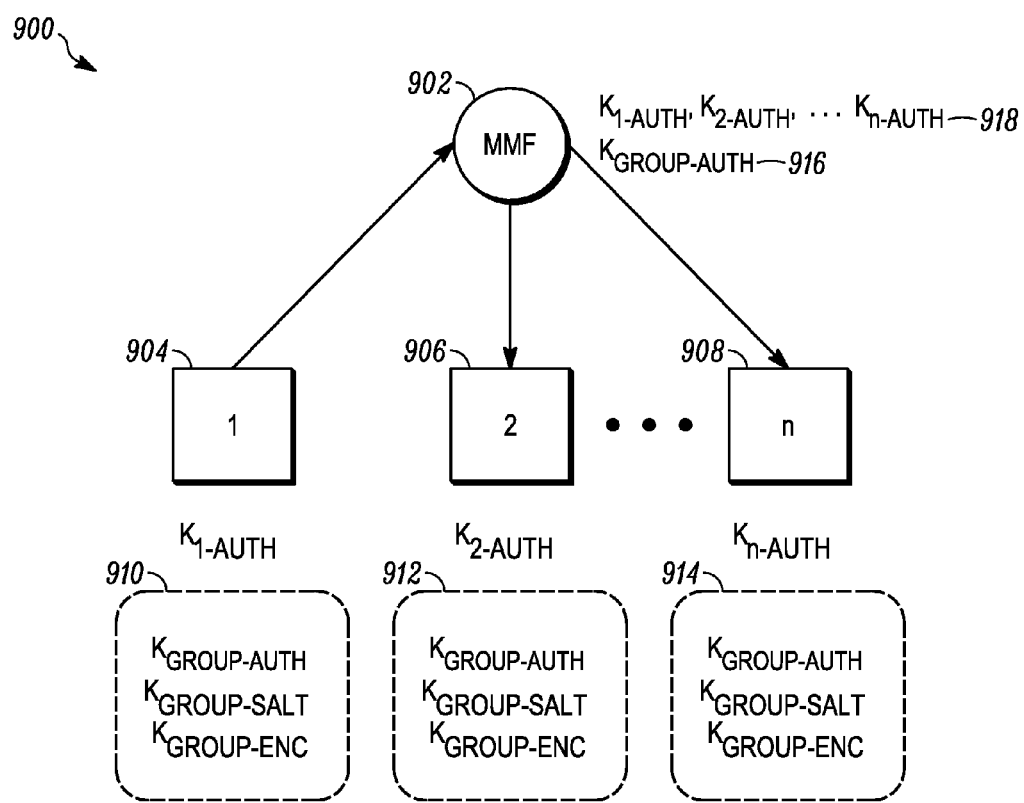
FIG. 9 is a topological diagram illustrating a method in accordance with some embodiments.
Figure 11:
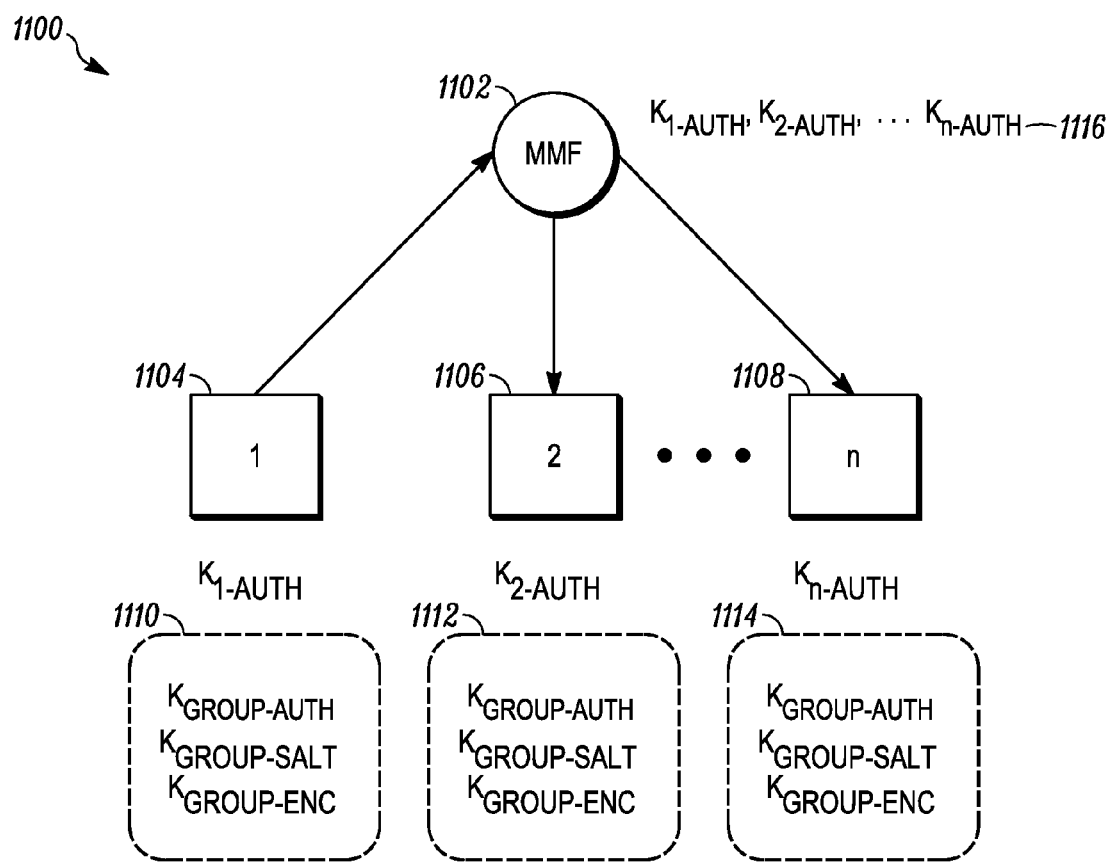
FIG. 11 is a topological diagram illustrating a method in accordance with some embodiments.

FIGS. 7, 9, and 11 each illustrate a topological diagram showing a method for secure communications in a communication system in accordance with the teachings herein. Turning to FIG. 7, communication devices, 704, 706, and 708, comprise a group, wherein the device 704 sends data, such as a voice call, to devices 706 and 708. The data, in the format of network packets, is routed through a MMF server 702 to the receiving devices 706 through 708.

In accordance with a diagram 700, each of the devices, 704 through 708, receives a master key 710 (712 and 714) for the group from a key-management server (not shown). The master keys 712 and 714 are the same master key as the master key 710. The master key 710 is a SRTP master key when SRTP is the network protocol in group communication. Within the group, each device receives the same master key. Each of the devices, 704 through 708, uses the SRTP key derivation algorithm to derive a group authentication key, $K_{group\text{-}auth}$, a group salt key, $K_{group\text{-}salt}$, and a group encryption key, $K_{group\text{-}enc}$ from the group master key. Alternatively, each device may receive $K_{group-auth}$, $K_{group-salt}$, and $K_{group-enc}$, without the master key, directly from the key-management server. The MMF server 702 receives $K_{group-auth}$ 716 from the key-management server, where $K_{group-auth}$ 716 is the same $K_{group-auth}$ as sent directly to each device 704, 706, and 708 or as that derived using master keys 710, 712, and 714. Device 704 encrypts data using $K_{group-salt}$ and $K_{group-enc}$. The device 704 further creates an authentication tag using $K_{group-auth}$, and attaches the tag to the encrypted data before the encrypted data is sent to the MMF server 702 in the form of network packets. The MMF server 702 receives the network packets from the device 704, and authenticates the network packets using $K_{group-auth}$ 716. Any network packet that passes the authentication is then forwarded to the destination devices, 706 through 708, by the MMF server 702. The MMF server 702 simply drops any network packet that fails the authentication. Devices 706 through 708, once having authenticated the received network packets using $K_{group-auth}$, further decrypt received network packets using $K_{group-salt}$ and $K_{group-enc}$. The method 700 is further illustrated by reference to FIG. 8.

Figure 8:
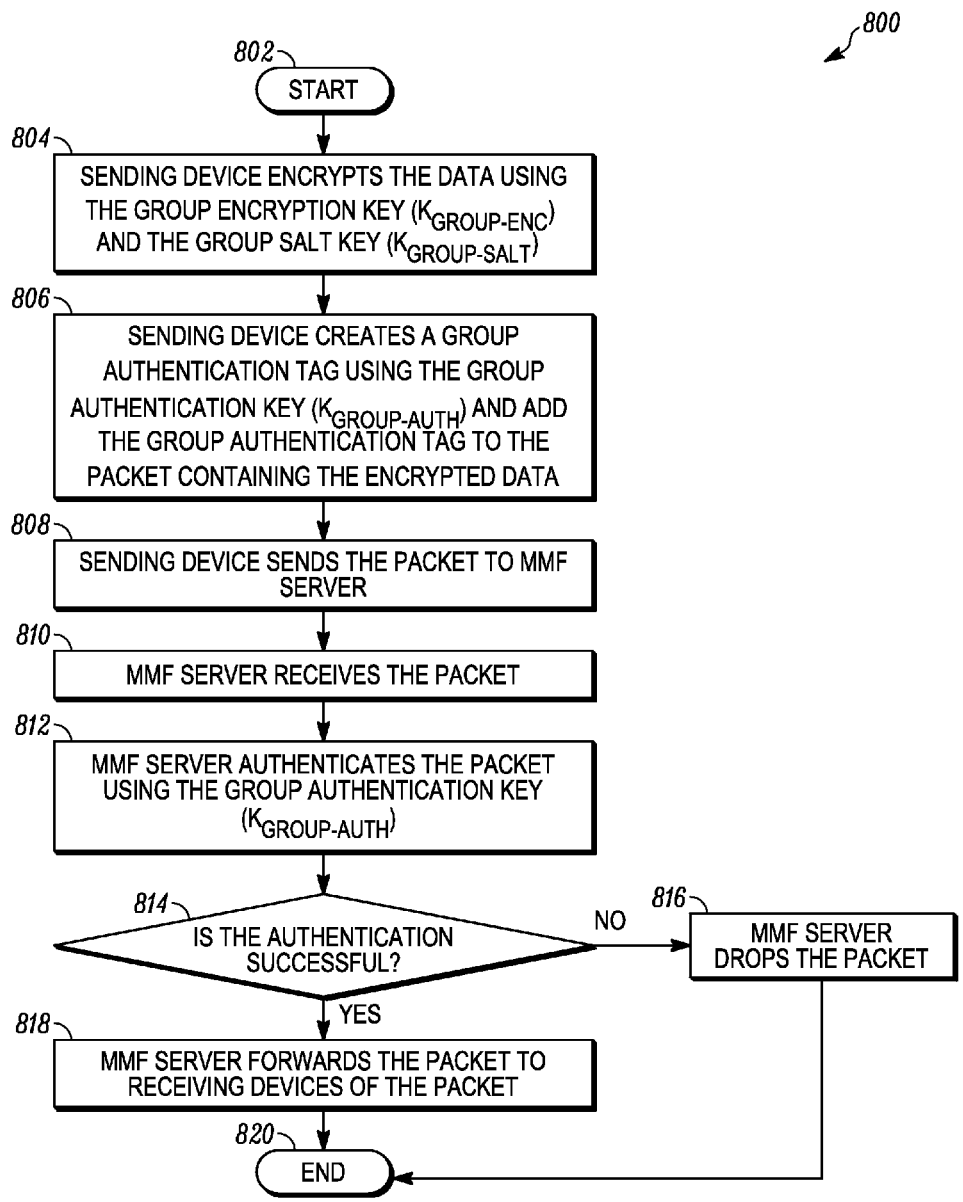
FIG. 8 is a logical flowchart illustrating a method in accordance with some embodiments.

Turning now to FIG. 8, a flow diagram showing a method 800 for secure communications in a communication system in accordance with the present teachings is shown. Method 800 starts at 802, where a device initiates data transmission, such as sending voice call data, to destination devices. Both the sending device and the destination devices are in a same group. As disclosed in FIG. 7, the devices already have knowledge of the group encryption key, $K_{group-enc}$, the group salt key, $K_{group-salt}$, and the group authentication key, $K_{group-auth}$, when the method 800 starts at 802. Based on AES in counter mode, the sending device encrypts the data using $K_{group-enc}$ and $K_{group-salt}$ at 804. It should be noted that other cryptographic technologies could be used to achieve the same purposes. At 806, the sending device creates a group authentication tag using the $K_{group-auth}$, and attaches the authentication tag to the network packet that contains the encrypted data. The sending device sends the network packet to a MMF server at 808, and the MMF server receives the network packet at 810. At 812, the MMF server authenticates the network packet using $K_{group-auth}$. As disclosed in FIG. 7, the MMF server already has knowledge of the group authentication key, $K_{group-auth}$, when the method 800 starts at 802.

The authentication may be performed by computing a new authentication tag using $K_{group-auth}$, and comparing the newly created authentication tag against the authentication tag contained in the network packet. If the two authentication tags match or are same, then the network packet is said to have passed the authentication. Otherwise, the network packet is said to have failed the authentication. It should be noted that the authentication can be performed in various other ways. At 814, the MMF server determines whether the network packet passes the authentication. If the network packet successfully passes authentication, the MMF server forwards the network packet to each destination device of the network packet, at 818, for example using a unicast technique or a broadcast technique. To multicast the packet, the MMF server sends the network packet to a multicast IP address, and the network infrastructure routes the network packet to each destination device of the network packet. If the network packet fails authentication, the MMF server drops the network packet, at 816, by simply ignoring the network packet, for instance. Alternatively, the MMF may perform other actions, such as more security checks on the network, in response to the authentication failure. Execution of the method 800 transitions to 820 from both 816 and 818.

In accordance with a diagram 900, FIG. 9 shows, in addition to a master key, each of communication devices 904 through 908 receives a source authentication key, $K_{n-auth}$, from a key-management server (not shown). As used herein, n stands for an integer, such as 1, 6, and 10. For example, $K_{1-auth}$ is a source authentication key for device 904, $K_{2-auth}$ is a source authentication key for device 906, and $K_{n-auth}$ is a source authentication key for device 908. The devices, 904 through 908, are in a communication group. As used herein, a source authentication key is unique to that source device, and two devices have different source authentication keys. Each of the devices 904-908 derives a group authentication key, $K_{group-auth}$, a group salt key, $K_{group-salt}$, and a group encryption key, $K_{group-enc}$, from the same master key 910, 912, and 914. Alternatively, each device may receive $K_{group-auth}$, $K_{group-salt}$, and $K_{group-enc}$ directly from the key-management server. A MMF server 902 receives from the key-management server a group authentication key, $K_{group-auth}$ 916, and all the source authentication keys, $K_{1-auth}$ through $K_{n-auth}$ 918. $K_{group-auth}$ 916 is the same $K_{group-auth}$ key that devices 904 through 908 derive using their respective master key 910, 912, 914 (or that is provided directly to the devices 904 through 908 from the key-management server). Alternatively, authentication keys $K_{1-auth}$ through $K_{n-auth}$ may be derived from a different master key from 910, 912, and 914, which the MMF receives from the key-management server.

When device 904 wants to convey data to the devices 906 through 908, device 904 encrypts the data using $K_{group-salt}$ and $K_{group-enc}$, and creates an authentication tag using $K_{1-auth}$. Device 904 adds the authentication tag to the encrypted data before device 904 sends the data to the MMF server 902. The MMF server 902 authenticates received network packets from the device 904 using $K_{1-auth}$. For a network packet that passes the authentication, the MMF server 902 strips or removes the authentication tag from the network packet, creates another authentication tag using $K_{group-auth}$, adds the newly created tag to the network packet, and redistributes the packet to the devices 906 through 908. The MMF server 902 simply drops any network packet that fails the authentication.

The devices 906 through 908 receive the network packet from the MMF server 902, and authenticate the network packet using $K_{group-auth}$. If the network packet passes the authentication, the encrypted data in the network packet is then decrypted using $K_{group-salt}$ and $K_{group-enc}$ by devices 906 through 908. The method 900 is further illustrated by reference to FIG. 10. A similar process is involved if one of the other devices in the group (e.g., 912 or 914) sends a packet to the MMF. That is, the MMF uses the $K_{n-auth}$ key associated with the sending device to authenticate the packet prior to stripping the original source authentication tag, attaching a group authentication tag and then forwarding the packet to the other devices in the group.

Figure 10:
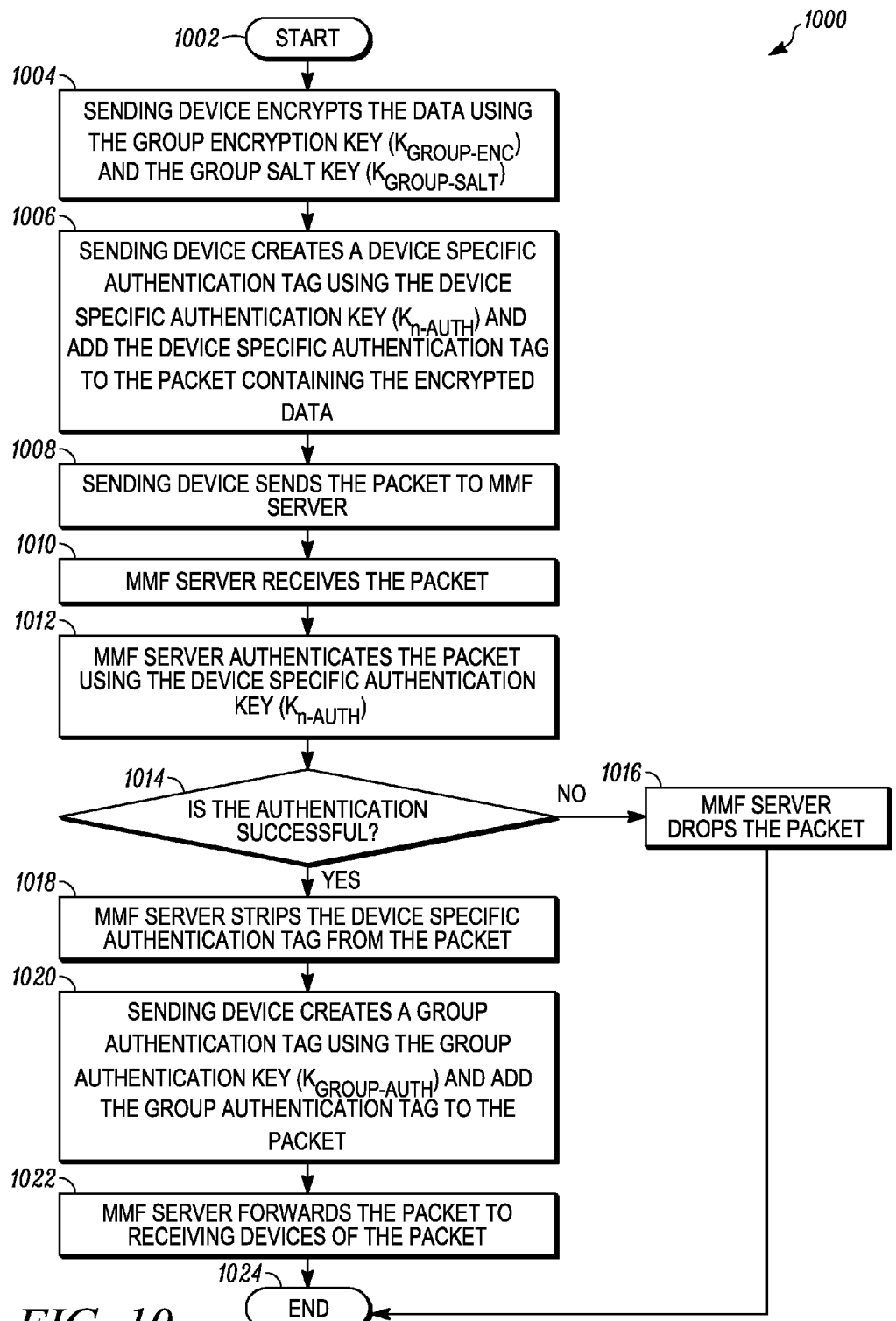
FIG. 10 is a logical flowchart illustrating a method in accordance with some embodiments.

Turning now to FIG. 10, a flow diagram showing a method 1000 for secure communications in a communication system in accordance with the present teachings is shown. Method 1000 starts at 1002, where a device initiates data transmission, such as sending voice data, to other devices of the same group. As disclosed in FIG. 9, the devices already have knowledge of the group encryption key, $K_{group-enc}$, the group salt key, $K_{group-salt}$, the group authentication key, $K_{group-auth}$, and the device specific source authentication key, $K_{n-auth}$, when the method 1000 starts at 1002. Based on AES in counter mode, the sending device encrypts the data using $K_{group-enc}$ and $K_{group-salt}$ at 1004. It should be noted that other cryptographic technologies could be used to achieve the same purposes. At 1006, the sending device creates an authentication tag using the sending device's source authentication key, $K_{n\text{-}auth}$, and attaches the device specific authentication tag to the network packet that contains the encrypted data. The sending device sends the network packet to a MMF server at 1008, and the MMF server receives the network packet at 1010.

At 1012, the MMF server authenticates the network packet using $K_{n\text{-}auth}$ that is the source authentication key of the sending device. As disclosed in FIG. 9, the MMF server already has knowledge of the source authentication keys of each device of the group. In addition, the MMF server is knowledgeable about the group authentication key, $K_{group\text{-}auth}$, when the method 1000 starts at 1002. The authentication maybe performed by computing a new authentication tag using the sending device's source authentication key, $K_{n\text{-}auth}$, and comparing the newly created authentication tag against the device specific authentication tag contained in the network packet. If the two authentication tags match or are same, then the network packet is said to have passed the authentication. Otherwise, the network packet is said to have failed the authentication. It should be noted that the authentication can be performed in various other ways.

At 1014, the MMF server checks whether the network packet passes the authentication. If the network packet passes the authentication, the MMF server strips the sending device specific authentication tag from the packet, at 1018. Moreover, the MMF server creates a group authentication tag using the group authentication key, $K_{group\_auth}$, and adds the group authentication tag to the packet at 1020. The MMF server redistributes the packet to each destination device of the packet, at 1022. Turning back to 1014, if the packets fail authentication, the MMF server may simply drop the packet, at 1016, by taking no further actions on the packet. Execution of the method 1000 transitions to 1024 from both 1016 and 1022.

Turning now to FIG. 11, a diagram 1100 illustrating secure communications in a communication system in accordance with the present disclosure is shown. Devices 1104, 1106 through 1108 form a group for the purpose of group communicating. A key-management server (not shown) sends the same master key 1110, 1112, 1114 to devices 1104 through 1108. Furthermore, each of the devices 1104 through 1108 receives a source authentication key, $K_{n\text{-}auth}$, from the key-management server. Herein, n stands for an integer, such as 1, 6, and 10. $K_{1\text{-}auth}$ is a source authentication key for device 1104, while $K_{2\text{-}auth}$ is a source authentication key for device 1106. Each of the devices 1104 through 1108 derives a group authentication key, $K_{group\text{-}auth}$ 1116, a group salt key, $K_{group\text{-}salt}$, and a group encryption key, $K_{group\text{-}enc}$, from the master key. Alternatively, each device may receive $K_{group\text{-}auth}$, $K_{group\text{-}salt}$, and $K_{group\text{-}enc}$ directly from the key-management server. A MMF server 1102 receives from the key-management server all the source authentication keys, $K_{1\text{-}auth}$ through $K_{n\text{-}auth}$, or alternatively a master key, different from 1110, 1112, 1114, through which the all the source authentication keys may be derived. When the device 1104 sends data to the devices 1106 through 1108, the device 1104 encrypts the data using $K_{group\text{-}salt}$ and $K_{group\text{-}enc}$, and creates a first authentication tag using $K_{group\text{-}auth}$. The first authentication tag is added to a network packet containing the encrypted data. Thereafter, the device 1104 creates a second authentication tag using $K_{1\text{-}auth}$, and adds the second authentication tag to the network packet before the network packet is sent to the MMF server 1102.

The MMF server 1102 receives the network packet from the device 1104, and authenticates the network packet against the second authentication tag using $K_{1\text{-}auth}$. If the network packet fails the authentication, the network packet is simply dropped by the MMF server 1102. Otherwise, the MMF server 1102 strips the second authentication tag from the network packet, and forwards the network packet to the devices, 1106 through 1108. Each of the devices, 1106 through 1108, receives the network packet, and authenticates the network packet using $K_{group\text{-}auth}$. Each of the devices 1106 through 1108 then decrypts the network packet if the network packet passes the authentication. Like the embodiment in FIG. 9, this approach enables source authentication of the packets received by the MMF (i.e., the MMF can cryptographically verify the source of incoming packets), while shifting the burden of calculating the group authentication tag to end devices rather than the MMF. The method 1100 is further illustrated by reference to FIG. 12.

Figure 12:
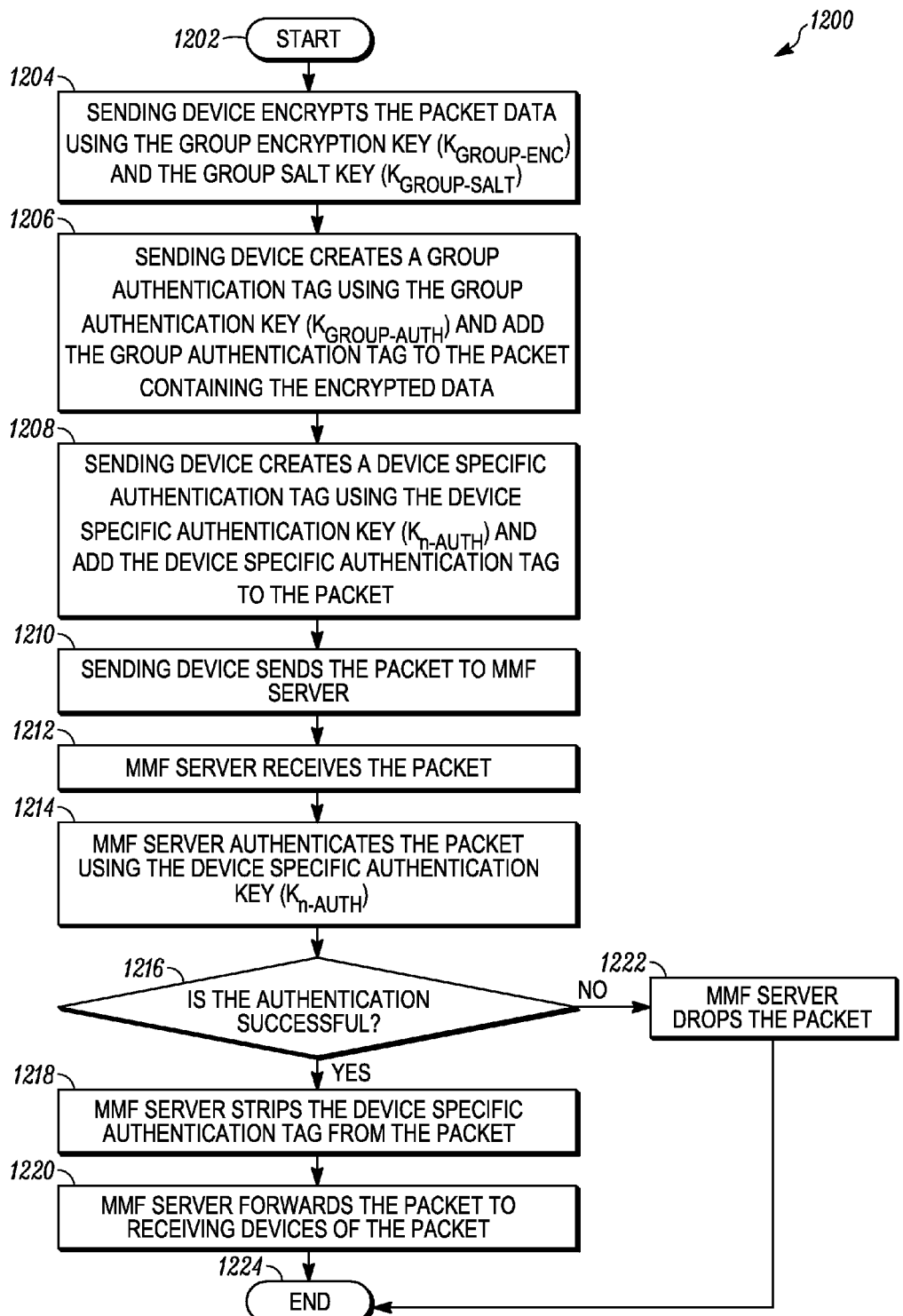
FIG. 12 is a logical flowchart illustrating a method in accordance with some embodiments.

Turning now to FIG. 12, a flow diagram showing a method 1200 for secure communications in a communication system in accordance with the present teachings is shown. Method 1200 starts at 1202, where a device initiates data transmission, such as sending voice data, to other devices of the same group. As disclosed in FIG. 11, the devices already have knowledge of the group encryption key, $K_{group\text{-}enc}$, the group salt key, $K_{group\text{-}salt}$, the group authentication key, $K_{group\text{-}auth}$, and the device specific source authentication keys ($K_{1\text{-}auth}$ through $K_{n\text{-}auth}$ respectively), when the method 1200 starts at 1202. Based on AES in counter mode, the sending device encrypts the data using $K_{group\text{-}enc}$ and $K_{group\text{-}salt}$ at 1204. It should be noted that other cryptographic technologies could be used to achieve the same purposes.

At 1206, the sending device creates a group authentication tag using $K_{group\text{-}auth}$, and attaches the group authentication tag to the network packet that contains the encrypted data. In addition, the sending device creates a source specific authentication tag, at 1208, using the sending device's source authentication key, and attaches the source specific authentication tag to the network packet. At this point, the network packet contains two authentication tags. The sending device sends the network packet to a MMF server at 1210, and the MMF server receives the network packet, at 1212. At 1214, the MMF server authenticates the network packet against the device specific authentication tag using $K_{1\text{-}auth}$. As disclosed in FIG. 11, the MMF server already has knowledge of the source authentication keys, $K_{1\text{-}auth}$ through $K_{n\text{-}auth}$.

The authentication may be performed by computing a new authentication tag using $K_{1\text{-}auth}$, and comparing the newly computed authentication tag against the source specific authentication tag contained in the network packet. If the two authentication tags match or are same, then the network packet is said to have passed the authentication. Otherwise, the network packet is said to have failed the authentication. It should be noted that the authentication can be performed in various other ways. At 1216, the MMF server determines whether the network packet passes the authentication. If the network packet passes authentication, the MMF server strips the device specific authentication tag from the packet, but leaves the group authentication tag in the network packet untouched, at 1218. The MMF server forwards the network packet to each receiving device of the network packet at 1220. Turning back to 1216, if the network packet fails authentication, the MMF server drops the network packet, at 1222, by simply ignoring the network packet. The MMF server may perform other actions in response to the authentication failure, such as further security checks. Also note that the MMF may also check the authenticity of the group authentication tag as an additional security measure and only forward packets that pass both the source and group authentication tests. Execution of the method 1200 transitions to 1224 from both 1220 and 1222.

Persons of skill in the art will understand that this disclosure may be extended to other embodiments than those specifically disclosed herein. In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," includes," "including," "contains," "containing," or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by"comprises . . . a", "has . . . a", "include . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. The non-processor circuits may include, but are not limited to, a radio receiver, a radio transmitter, signal drivers, clock circuits, power source circuits, and user input devices. As such, these functions may be interpreted as steps of a method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for secure communications in a communication system, the method comprising:
   an infrastructure device performing:
   receiving at least one authentication key, from a key-management server, without receiving a corresponding encryption key;
   receiving a packet from a source device, wherein the packet is encrypted using the corresponding encryption key;
   authenticating the packet without cryptographically altering the packet, wherein the authenticating is performed using the at least one authentication key; and
   forwarding the authenticated packet to a destination device;
   wherein the at least one authentication key comprises a group authentication key and a source authentication key for the source device, and the packet comprises a source authentication tag, and wherein authenticating the packet comprises:
   performing source authentication on the packet using the source authentication key;
   removing the source authentication tag after performing the source authentication; and
   adding a group authentication tag to the packet using the group authentication key to generate the authenticated packet that is forwarded to the destination device.

2. The method of claim 1:
   wherein the at least one authentication key comprises a group authentication key;
   wherein authenticating the packet comprises performing group authentication on the packet using the group authentication key.

3. The method of claim 1, wherein the at least one authentication key comprises a source authentication key for the source device, and the packet comprises a source authentication tag and a group authentication tag, and wherein authenticating the packet comprises:

performing source authentication on the packet using the source authentication key; and removing the source authentication tag after performing the source authentication and retaining the group authentication tag to generate the authenticated packet that is sent to the destination device.

4. The method of claim 1, wherein receiving the at least one authentication key comprises receiving the at least one authentication key in a Multimedia Internet KEYing (MIKEY) message.

5. The method of claim 1 further comprising receiving an indication that the at least one authentication key is for authentication but not for encryption of packets.

6. The method of claim 5, wherein receiving the indication comprises receiving the indication in a TYPE subfield of a Key Data Sub-Payload of a Multimedia Internet KEYing (MIKEY) message or in a Type subfield of a General Extension Payload of the MIKEY message.

7. A method for secure communications in a communication system, the method comprising:

a key-management server performing:

sending a first set of keys to a source device, wherein the first set of keys enables both authentication and encryption of packets sent by the source device to a destination device;

sending a second set of keys to an infrastructure device that forwards the packets sent by the source device to the destination device, wherein the second set of keys enables authentication but not decryption of the packets sent by the source device to the destination device;

wherein sending the first set of keys comprises sending a source authentication key and a master key, wherein the master key is used to derive a group authentication key and an encryption key, and sending the second set of keys comprises sending the source authentication key but not the master key, the group authentication key, or the encryption key.

8. The method of claim 7, wherein sending the first set of keys comprises sending a master key that is used to derive an authentication key and an encryption key, and sending the second set of keys comprises sending the authentication key but not the master key or the encryption key.

9. The method of claim 7, wherein sending the first set of keys comprises sending a source authentication key and a master key, wherein the master key is used to derive a group authentication key and an encryption key, and sending the second set of keys comprises sending the source authentication key and the group authentication key but not the master key or the encryption key.

10. The method of claim 7 further comprising indicating to the infrastructure device that the second set of keys enables authentication but not decryption of packets and that no further key derivation is needed.

11. The method of claim 10, wherein indicating to the infrastructure device that the second set of keys enables authentication but not decryption of packets comprises setting a flag in a TYPE subfield of a Key Data Sub-Payload of a Multimedia Internet KEYing (MIKEY) message or in a Type subfield of a General Extension Payload of the MIKEY message.

12. The method claim 7, wherein sending the first and second sets of keys comprises sending each of the first and second sets of keys in a Multimedia Internet KEYing (MIKEY) message.

13. A system for secure communications, the system comprising:

a key-management server comprising a processing device coupled to an interface and adapted to:

send a first set of keys to a source device, wherein the first set of keys enables both authentication and encryption of packets sent by the source device to a destination device;

send a second set of keys, wherein the second set of keys enables authentication but not decryption of the packets sent by the source device to the destination device; and the infrastructure device comprising a processing device coupled to an interface and adapted to:

receive the first set of keys;

receive a packet from the source device, wherein the packet is encrypted;

authenticate the packet without cryptographically altering the packet, wherein the authenticating is performed using the first set of keys; and forward the authenticated packet to the destination device;

wherein the first set of keys comprises a master key used to derive an encryption key, an authentication key, and a salt key for the authentication and encryption or decryption of the packets sent by the source device to a destination device, and the second set of keys comprises at least one of the authentication key or a unique authentication key for the source device for the authentication of the packet received at the infrastructure device from the source device but not the master key or the encryption key.

14. The system of claim 13, wherein the first set of keys is sent in a first Multimedia Internet KEYing (MIKEY) message, and the second set of keys is sent in a second MIKEY message.

15. The system of claim 14, wherein the second MIKEY message further indicates in a TYPE subfield of a Key Data Sub-Payload of the second MIKEY message or in a Type subfield of a General Extension Payload of the second MIKEY message that second set of keys enables authentication but not decryption of the packets sent by the source device to the destination device.

16. The system of claim 13, wherein the infrastructure device is a media manager.

17. The system of claim 13, wherein the infrastructure device is a security gateway that handles security for a media manager.

* * * * *